United States Patent

Kolankowsky et al.

[15] 3,638,199

[45] Jan. 25, 1972

[54] DATA-PROCESSING SYSTEM WITH A STORAGE HAVING A PLURALITY OF SIMULTANEOUSLY ACCESSIBLE LOCATIONS

[72] Inventors: Eugene Kolankowsky, Pleasant Valley; Robert F. McMahon, Poughkeepsie, both of N.Y.

[73] Assignee: International Business Machines Corporation, Armonk, N.Y.

[22] Filed: Dec. 19, 1969

[21] Appl. No.: 886,508

[52] U.S. Cl. ....................340/172.5

[51] Int. Cl. ....................G06f 1/00

[58] Field of Search ....................340/172.5, 174 NC, 174 TB

[56] References Cited

UNITED STATES PATENTS

| | | | |
|---|---|---|---|
| 3,172,087 | 3/1965 | Durgin | 340/174 NC |
| 3,212,064 | 10/1965 | Krieger | 340/172.5 |
| 3,226,692 | 12/1965 | Fuller et al. | 340/172.5 |
| 3,332,066 | 7/1967 | Correll et al. | 340/172.5 |
| 3,374,465 | 3/1968 | Richmond et al. | 340/172.5 |
| 3,399,387 | 8/1968 | Kunze | 340/172.5 |
| 3,533,085 | 10/1970 | Murphy | 340/172.5 |

*Primary Examiner*—Gareth D. Shaw
*Assistant Examiner*—Harvey E. Springborn
*Attorney*—Hanifin and Jancin and Gunter A. Hauptman

[57] ABSTRACT

In a data-processing system, a central processing unit and a group of input/output units simultaneously read information from, and write information into, several locations of a single storage unit. The storage is provided with two storage address registers and two data registers. Each storage address register specifies a location in storage with which information in the associated data register is communicated. The storage is an array of storage elements each of which is selected by driving two out of three wires associated with that storage element. Characterizing the three wires as X, Y and Z, each location is accessed by driving the Z-wire for that location and one of the X- or Y-wires. A magnetic core, capable of assuming one of two states in accordance with half select information on two of three wires threaded through it, is disclosed as an example of a storage element. Sense amplifiers, connected to the X- and Y-wires, receive stored information from the undriven wire.

6 Claims, 20 Drawing Figures

INVENTORS
EUGENE KOLANKOWSKY
ROBERT F. Mc MAHON
BY Gunter A. Hauptman
ATTORNEY

PATENTED JAN 25 1972 3,638,199

SHEET 03 OF 12

DATA-PROCESSING SYSTEM WITH A STORAGE HAVING A PLURALITY OF SIMULTANEOUSLY ACCESSIBLE LOCATIONS

CROSS-REFERENCES TO RELATED APPLICATIONS

While, several embodiments of a data-processing system, and a magnetic core embodiment of a storage unit for such a system, are disclosed in this application, a solid-state embodiment of the storage unit is disclosed in application Ser. No. 886,511 filed Dec. 19, 1969 [PO-9-69-034] of E. Kolankowsky et al., entitled "Storage Having a Plurality of Simultaneously Accessible Locations" filed on even date herewith and assigned to the International Business Machines Corporation and a semiconductive cell for the storage unit is disclosed in application Ser. No. 886,509 filed Dec. 19, 1969 [PO-9-69-042] of E. Kolankowsky entitled "Semiconductive Cell For a Storage Having a Plurality of Simultaneously Accessible Locations" filed on even date herewith and assigned to the International Business Machines Corporation.

BACKGROUND OF THE INVENTION

1. Field of the Invention

This invention pertains to electronic data-processing systems having randomly accessible storages. More particularly, the invention relates to systems created by storages having a plurality of simultaneously accessible locations and to a preferred embodiment of such a storage.

2. Description of Prior Art

Data-processing systems frequently perform simultaneous operations on the same blocks of information. In the prior art, data computation operation can be performed on external information only after the information has been entered into storage and then only to the exclusion of the use of the storage for entry of additional external information. A variety of priority, buffering and control techniques have been developed to permit a single storage to be shared by a plurality of units requiring access to the storage. While prior art systems perform operations utilizing the same storage unit, these operations must occur at different times, involve constraints on the relationship of accessed locations, require duplicate storages, etc.

In a data-processing system having a storage, it is desirable to access (by specifying the "addresses" of) a plurality of locations in the storage simultaneously. Heretofore, it has been possible to access (for removing or "reading" and entering or "writing" information) only one location at a time in such a storage, unless strict restrictions are acceptable. One prior art technique permits each address to access its location in storage by lining up the addresses, or "queuing" them, so that they sequentially access the desired storage locations. While sequential accessing of storage locations has been developed to a sophisticated point, speed is limited (because each address must wait its turn) and it is difficult to correlate information emerging from a storage with the addresses requiring the information. To avoid these problems, several schemes for obtaining simultaneous access have been proposed; however, they have required restrictions on the types, times and sources of addressing permitted. For example, it has been suggested that a storage may be constructed to permit accessing of a number of contiguous locations. However, this technique is not generally applicable to simultaneous addressing of any two or more locations in the storage. In another prior art approach, storages are divided into a number of sections. While locations in different sections may be simultaneously accessed, locations in the same section may not be simultaneously addressed. Also in the prior art, it has been recognized that since all locations in an associative storage may be simultaneously accessed, such a storage may be adapted for use in a system requiring simultaneous access to less than all of its locations. However, this involves unnecessarily complex hardware and slow operation. Another prior art approach provides a plurality of storages either multiplexed in time division on a single bus or each containing identical information. Neither permits simultaneous access to any desired storage locations in a single storage. Among other solutions, it has been suggested in the prior art that two-dimensional storage arrays can be provided with circuitry permitting simultaneous accessing of any desired information; however, such techniques are not adaptable to data-processing systems requiring three-dimensional storage arrays.

Particular reference is made to the article "A High-Speed Integrated Circuit Scratch Pad Memory" by I. Catt et al., published in the Proceedings of the Fall Joint Computer Conference, 1966, page 315, wherein it is suggested that multiple, independently addressed "read channels" can be included in a storage to allow simultaneous (read or read/write) access to more than one storage location. The system provides two storage positions for every bit of storage and therefore gives "-simultaneous" accessing by doubling the storage positions.

SUMMARY OF THE INVENTION

The invention described herein is a system utilizing a single three-dimensional storage array capable of being simultaneously accessed by a plurality of addresses. The preferred embodiment disclosed here is a three-dimensional core storage array wherein each core represents a single bit of information which may be accessed simultaneously with any other core or cores by any one of two or more address sources.

There are disclosed here unique arrangements wherein two storage address registers are connected to decoders driving a single storage capable of simultaneously communicating information to two data registers. The storage address registers and data registers may be independently utilized by the system as though they were accessing different storages, though they are in fact accessing the same pool of information in one storage. The only system constraint is that different information should not be written into the same location at the same time. In one embodiment, input/output data and central processing unit data are simultaneously exchanged with the storage without conflict. For example, arithmetic operations may be performed on data as it enters the storage from external magnetic tape units without the special buffering, priority and control circuits previously required. If the external input/output devices and the central processing unit have simultaneous access to the same storage array, the magnetic tape units may enter information into a number of locations in the storage array and the central processing unit may simultaneously access the same locations to process the information in accordance with a program of instructions. Further, with appropriate interlocks, more than two independent sources of addresses may access a storage array. In another embodiment, input/output data, central processing unit data and microprogram data may share the same storage array by having two of the three share its accessing with the remaining one. Obviously this technique can be extended to permit any number of units to share a single storage. Since the storage may be designed to permit more than two simultaneous accesses, the system is not limited to any particular number of independently operating units. The novel system is further defined in terms of a preferred embodiment comprising a particular storage array construction. The storage array comprises a three-dimensional stack of planes, each plane containing a number of cores defined by X- (row) and Y- (column) coordinates, every X-Y coordinate defining a multibit word location. There are $n$ planes, every plane representing one bit of every word. An entire word is located in a position in the array defined by a Z-coordinate. Each bit of a word is in a different plane but has the same X-Y coordinates. Assuming that the memory is designed to permit simultaneous accessing of two locations in the storage, X-, Y- and Z-drivers and X and Y sense amplifiers and bit drivers are available to each core position. As in standard core storage systems, accessing occurs during storage cycles each comprising a read operation, which inherently destroys the information at the accessed location, followed by a write operation. In reading information from a location, the information is sensed by a sense amplifier during the read operation and the accessed information is rewritten during the write cycle. When writing, the read operation destroys the information in the location (the sense amplifiers are inoperative) and the desired information is then written into the accessed location. In the embodiment disclosed here, a particular location is accessed by driving the Z-driver and a selected one of the X- and Y-drivers. During reading, the sense amplifier attached to the unselected one of the X- and Y-drivers is operated and the bit drivers are not operated. During writing, the bit drivers connected to the selected one of the X- and Y-drivers are operated in accordance with the information to be written. For example, if the X- and Z-drivers are activated, the sense amplifiers connected to the Y-driver will sense the contents of the accessed location and during the write operation, the X-drivers corresponding to 1-bits are driven in the opposite direction. Since each word is uniquely defined by a Z-coordinate and may be accessed by a combination of a Z-driver and either an X- or Y-driver, it is possible to simultaneously access any two locations by activating their Z-drivers and their X- or Y-drivers as follows: (a) if the two locations are in the same row, their Z-coordinates and the common X-coordinate are chosen, (b) if they are in the same column, their Z-coordinates and the common Y-coordinate are chosen, and (c) if the locations are "diagonally" (different rows and columns) located, their Z-coordinates and their X-coordinates are chosen. With regard to case (c), the Y-coordinates could have been chosen in place of the X-coordinates.

It is foreseen that a storage array may have locations definable by a plurality of coordinates and that the number of locations simultaneously accessible in the array is limited only by the number of coordinates chosen.

DESCRIPTION OF THE PREFERRED EMBODIMENTS

Multiaccess Systems

Figure 1:
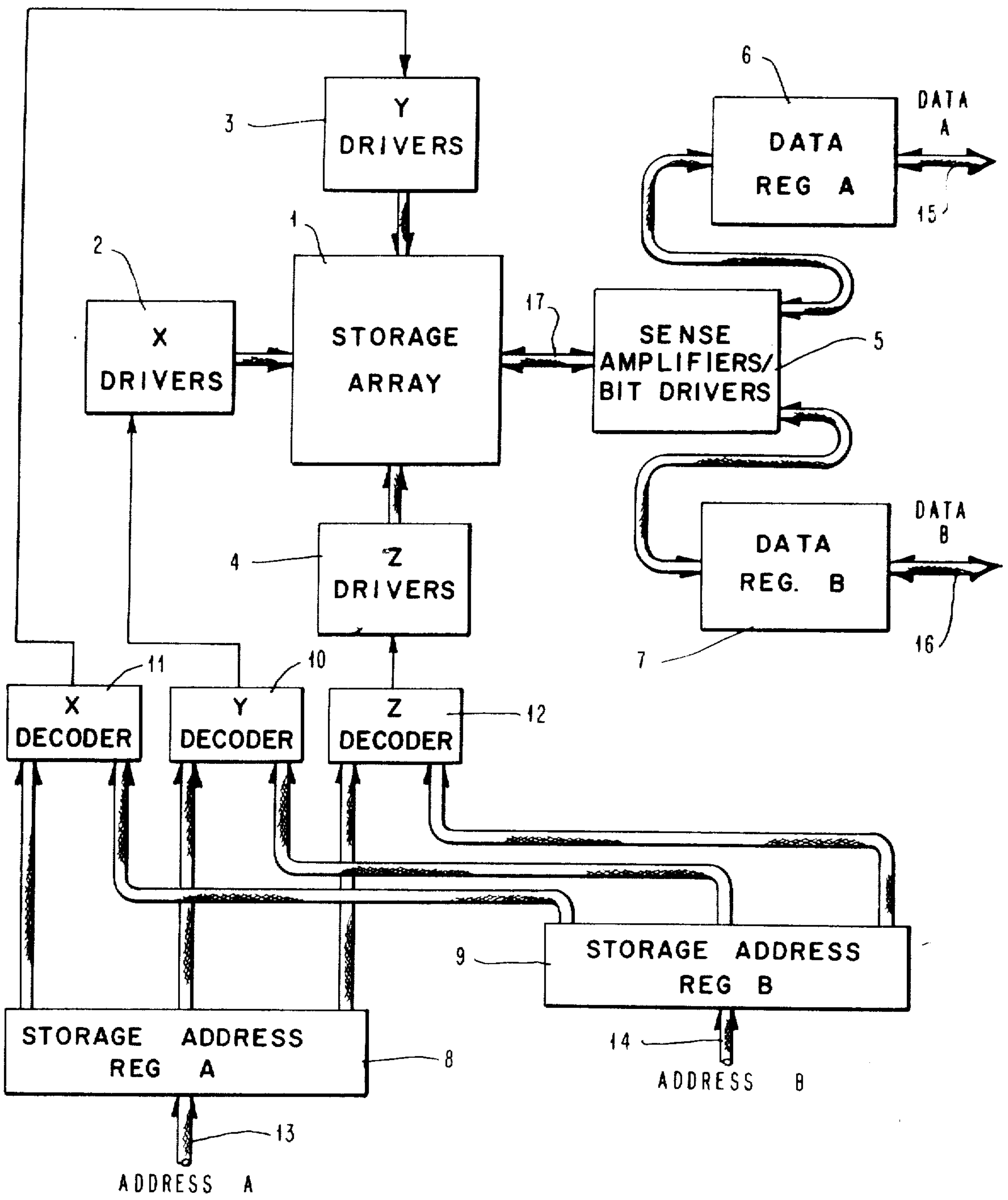
FIG. 1 is a block diagram showing an embodiment of a system generally illustrating the invention.

A novel system wherein two independent related subsystems A and B simultaneously access a plurality of locations in a storage array 1 is generally illustrated in FIG. 1. Locations specified by subsystems A and B are simultaneously accessed by a combination of signals provided on X-drivers 2, Y-drivers 3 and Z-drivers 4. The contents of the accessed locations are communicated by sense amplifiers/bit drivers 5 and data registers 6 and 7 for subsystems A and B respectively. While two data registers are shown, the invention is not limited to accessing of only two locations at a time. Locations are specified by addresses placed in storage address registers 8 and 9 for subsystems A and B respectively. The addresses are made available to X-decoder 11, Y-decoder 10 and Z-decoder 12 which select appropriate ones of the drivers 2, 3 and 4.

In operation, two addresses supplied on address buses 13 and 14 specify two locations to be simultaneously accessed in storage array 1 and communicated with corresponding ones of data buses 15 and 16. The contents of the locations are exchanged with the external system via data buses 15 and 16. When a read operation is specified, signals will be transferred from the addressed location in storage array 1 via bus 17 to the sense amplifiers 5 and the appropriate data register 6 or 7. During the write operation, the bit drivers in sense amplifiers/bit drivers 5 cause signals to be supplied to the storage array 1 via bus 17 to write data from data register 6 or 7. The addresses on buses 13 and 14 may be provided for any mixture of reading or writing operations (it being necessary only that the system be aware if it has specified that addresses A and B both write into the same location of the storage array 1). It will be understood by those skilled in the storage art that this description is a simplification of the circuits required. Details will be given below with reference to a specific embodiment of the core storage array.

Figures 2A, 2B:
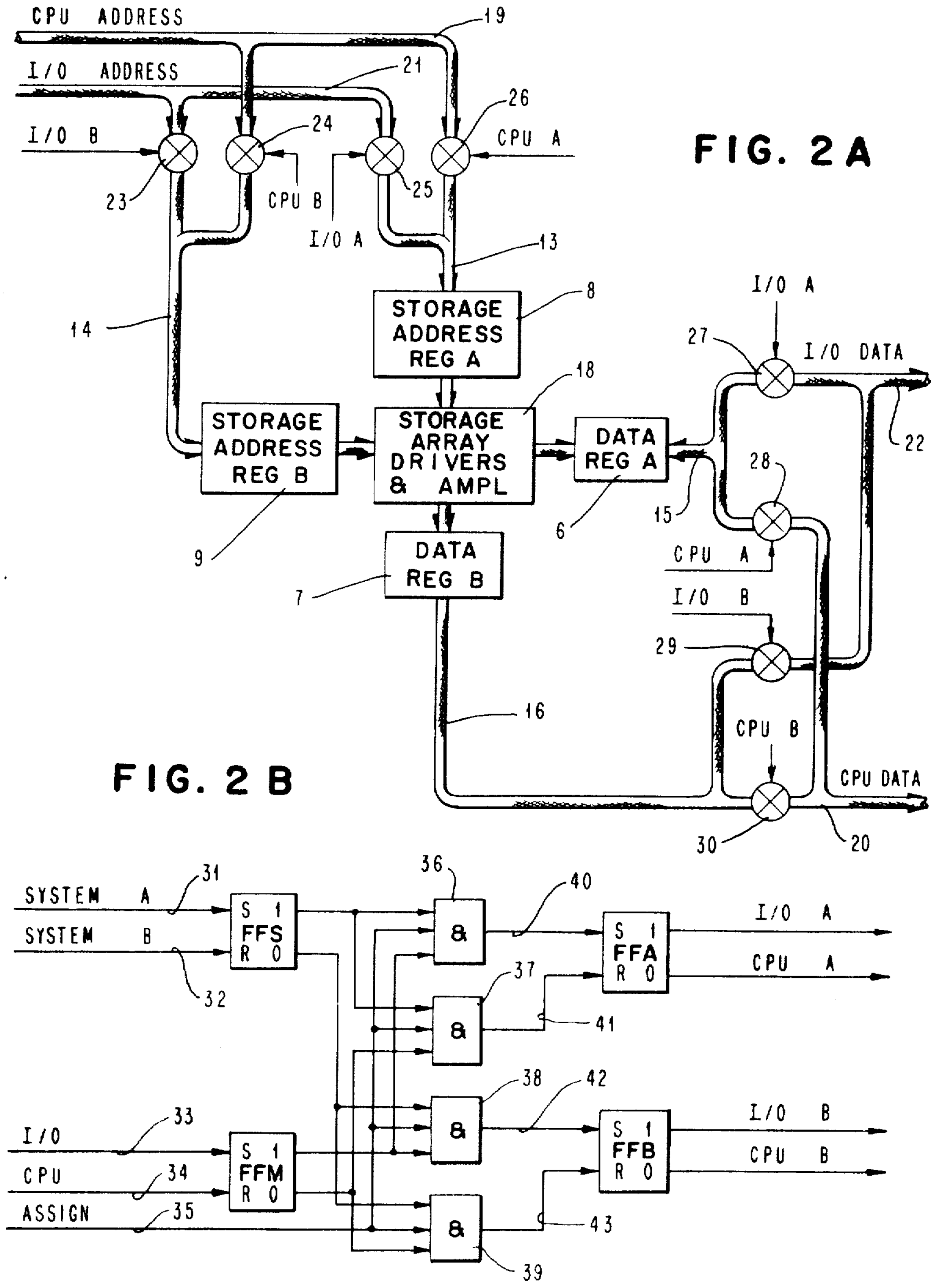
FIG. 2A is a block diagram showing one embodiment of a system comprising one aspect of the invention.
FIG. 2B is a logic diagram showing controls for the system of FIG. 2A.

Referring now to FIG. 2A, there is shown one preferred embodiment of a system illustrating the invention. The storage array 1, drivers 2, 3 and 4 and the sense amplifiers/bit drivers 5 are indicated by block 18 and are accessed by addresses supplied to storage address registers 8 and 9 via buses 13 and 14. Data is exchanged with the system via data registers 6 and 7 and buses 15 and 16. The source of addresses and data may, for example, be either a central processing unit (CPU) or an input/output (I/O) subsystem, though any two normally independent systems or subsystems may be connected. The central processing unit supplies addresses on bus 19 and exchanges data via bus 20. The input/output subsystem supplies addresses on bus 21 and exchanges data on bus 22. Gates 23 through 30 connect appropriate ones of the buses to desired ones of the storage address registers 8 and 9 and data registers 6 and 7 in accordance with signals supplied to operate the gates. The storage array, drivers and amplifiers 18 appear to the system as two independent storages, one available to system A and the other to system B. The gates are operated to assign the central processing unit buses 19 and 20 to one of the systems A and B and the input/output buses 21 and 22 to the other one of the systems A and B. For example, if the input/output subsystem is designated as system A and the central processing unit is designated as system B, the gates 24, 25, 27 and 30 are operated. Thereafter, the addresses on input/output address bus 21 are entered into storage address register 8 for system A and information is exchanged between the storage array drivers and amplifier 18 and input/output data bus 22 via data register 6 for system A. Similarly, storage address register 9 and data register 7 are assigned to buses 19 and 20.

A circuit for supplying the gating signals is illustrated in FIG. 2B. A system assignment is made by supplying a system indication signal on either line 31 or 32 together with a signal on the desired one of the input/output line 33 or central processing unit line 34 while a signal is applied to the "assign" line 35. For example, if the input/output units are to be assigned to system A, signals are supplied on lines 31, 33 and 35. Thereafter, signals would be applied on lines 32, 34 and 35 to assign the central processing unit to the other system B. Flip-flop FFS is set in accordance with a signal on either line 31 or 32 to store the desired system assignment. Flip-flop FFM is set in accordance with signals on line 33 or 34 to store the desired unit assignment mode. AND-circuits 36 through 39 are connected to flip-flops FFS and FFM to indicate at their outputs 40 through 43 the four possible combinations of settings of flip-flops FFS and FFM. Flip-flops FFA and FFB are then set in accordance with signals on lines 40 through 43 to indicate at their outputs the assignment of systems for controlling the gates 23 through 30 in FIG. 2A.

Figures 3A, 3B:
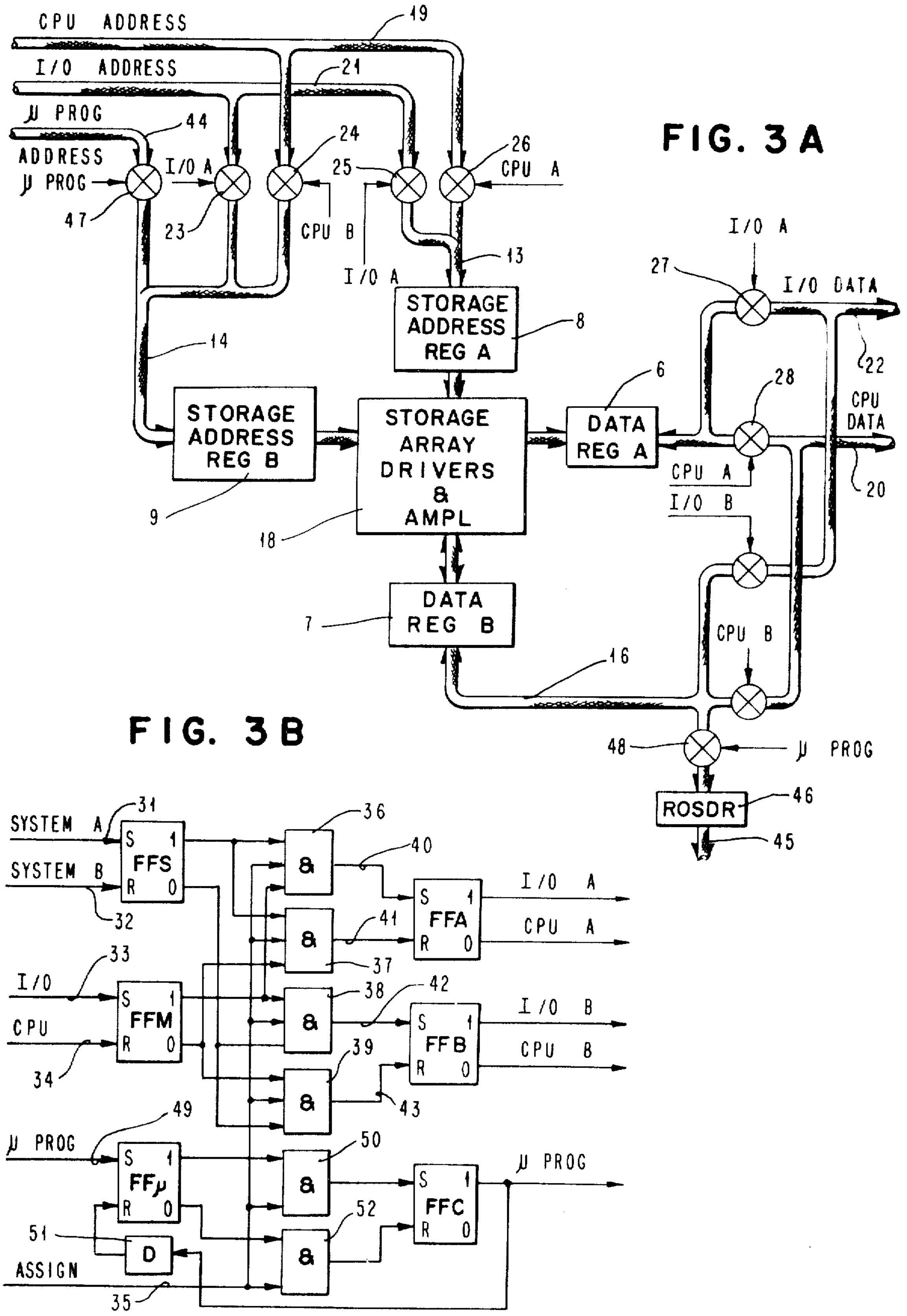
FIG. 3A is a block diagram showing another embodiment of a system comprising one aspect of the invention.
FIG. 3B is a logic diagram of controls for the system of FIG. 3A.

Referring now to FIG. 3A, the system of FIG. 2A is modified to give access to the storage array, drivers and amplifiers 18 to an additional system or subsystem, for example, a microprogram device. In many data-processing systems, control is exercised by a microprogram stored in a read-only storage device. The control information normally stored in a read-only storage can, in the alternative, be stored in the addressable storage array normally provided for use by the CPU and I/O device if appropriate protection from undesired accessing is provided. Therefore, the control information can be more voluminous because currently unneeded control information can be stored in an external backup storage. Flexibility is also provided by permitting the central processing unit to modify control information. Read-only control information is stored in the storage array, drivers and amplifiers 18 together with information relating to the input/output subsystem and the central processing unit. The location of information in the storage array, drivers and amplifiers 18 is indicated by addresses on a microprogram address bus 44 and information is exchanged on bus 45 via a read-only storage data register (ROSDR) 46. The microprogram may share the use of the storage array, drivers and amplifiers 18 by assigning the microprogram to either system A or system B and then assigning one, but not both, of the input/output subsystem or in the central processing unit to the other one of the systems A and B. This is accomplished by controlling the gates 23 through 30, 47 and 48. To connect the microprogram address bus 44 to storage address register 9, gate 47 is operated and gate 48 is operated to connect ROSDR 46 to the data register 7. Either the input/output subsystem or the central processing unit may then be assigned to storage address register 8 and data register 6 for system A. However, if the microprogram system is not connected, the system of FIG. 3A operates in the identical manner as the system of FIG. 2A and one of the input/output subsystems or the CPU may be assigned to system A and the other to system B.

Controls for supplying the gating signals in FIG. 3A are shown in FIG. 3B. Input/output subsystem and central processing unit signals for gates 23 through 30 are supplied by flip-flops FFA and FFB in accordance with the operation of flip-flops FFS and FFM in the manner previously described with reference to FIG. 2B. When the microprogram is assigned (to storage address register 9 and data register 7 of system B), signals are applied on lines 49 and 35 setting the flip-flop FF$\mu$. AND-circuit 50 is operated by the simultaneous signals on the "assign" line 35 and the one state of the flip-flop FF$\mu$ to set the flip-flop FFC. As a result, flip-flop FFC supplies a signal on the $\mu$-program gate line to gates 47 and 48. Subsequently, after removal of the signal on the "assign" line 35, the delay circuit 51 passes a signal from the $\mu$-program gate line to reset the flip-flop FF$\mu$. The next time that the "assign" line 35 is signalled, AND-circuit 52 will reset the flip-flop FFC.

CORE STORAGE EMBODIMENT

In general the storage array 1 indicated in FIG. 1 may be constructed in a wide variety of ways to achieve the operations described herein. It is essential that a plurality of locations in the storage be simultaneously accessible without unduly increasing the amount of accessing circuits required. A magnetic core embodiment of such a storage array will now be described in detail.

Figure 4:
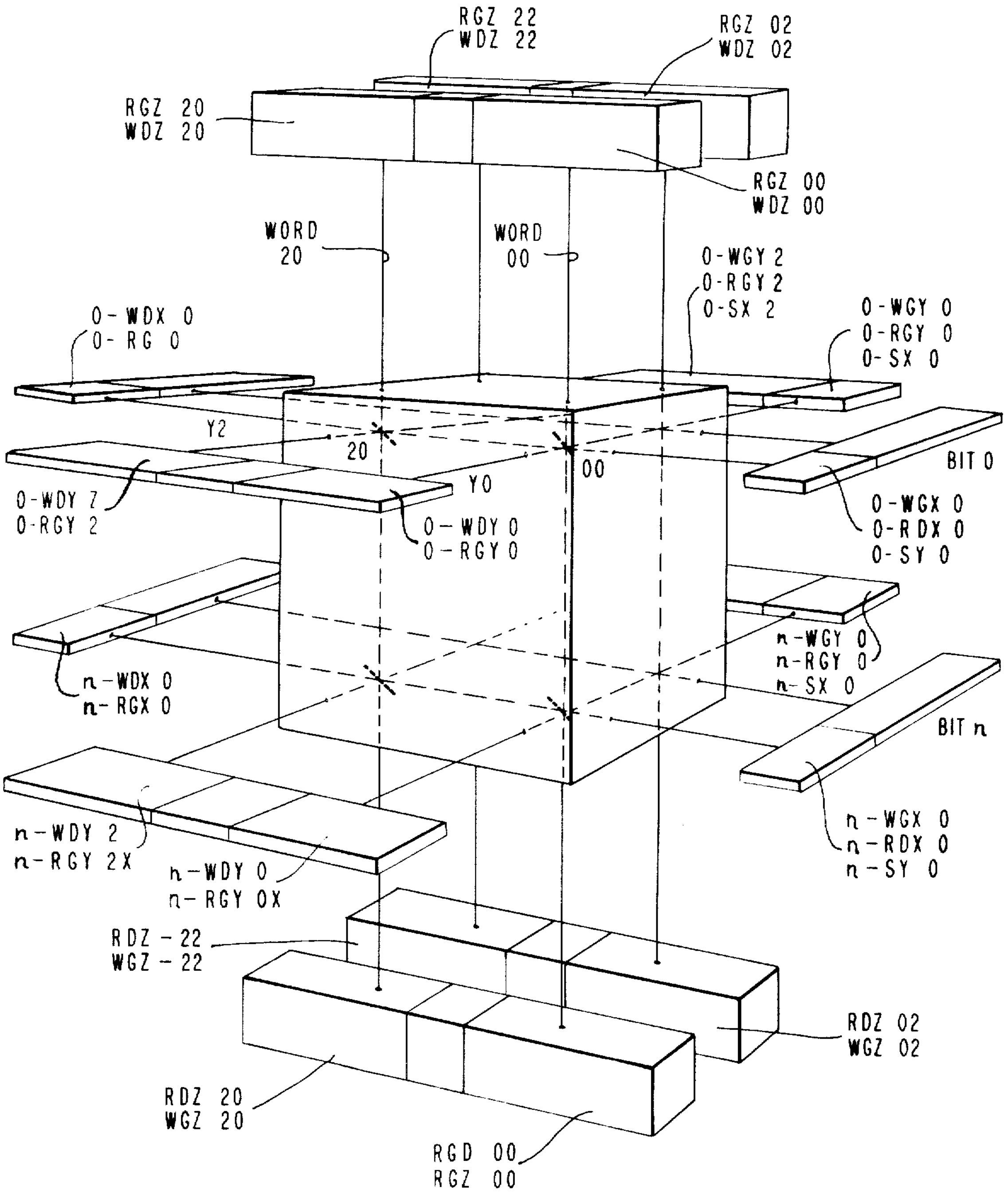
FIG. 4 is a three-dimensional view of a preferred embodiment of a core storage usable in the invention.

Referring to FIG. 4, there is shown an exploded three-dimensional view of a core array together with the drivers, registers and sense amplifiers required to perform simultaneous accessing of any two locations. The three-dimensional array illustrates storage of 16 words each consisting of *n* bits defined by X- and Y-coordinates. The array is divided into *n* planes so that there are 16*n* cores in the array each identified by a quartenary location number from 01 to 00. The first and last bits of the eighth and 16th word locations 20 and 00 are indicated in FIG. 4. Each of the cores in the array is threaded by a Z-line, an X-line and a Y-line. Each line is identified by its position (X0, X1, X2 or X3; Y0, Y1, Y2 or Y3; Z00, Z01, Z10, etc.) and each circuit element by the initials of its function, prefixed by the plane number and suffixed by the assigned line. Taking word 20 as an example, Z-line Z20 connects a read driver RDZ20 and write driver WDZ20 to a read gate for that word RGZ20 and write gate WGZ20 respectively. (No plane number prefixes are required for word lines). The X-line threading the core at location 20 bit number 0 connects a write bit driver 0–WDX0 and read bit gate 0–RGX0 with write bit gate 0–WGX 0, read bit driver 0–RDX0 and sense preamplifier 0–SY0. The Y-line threading the zero bit of the word at location 20 connects write bit driver 0–WDYZ and read bit gate 0–RGY2 with write bit gate 0–WGY2, read bit driver 0–RGYZ and sense preamplifier 0–SX2. Note that, the X- and Y-coordinates are not sequentially numbered, and the words are not indicated in terms of their X- and Y-coordinates, as will be explained in detail subsequently with respect to FIG. 8A.

Figure 5:
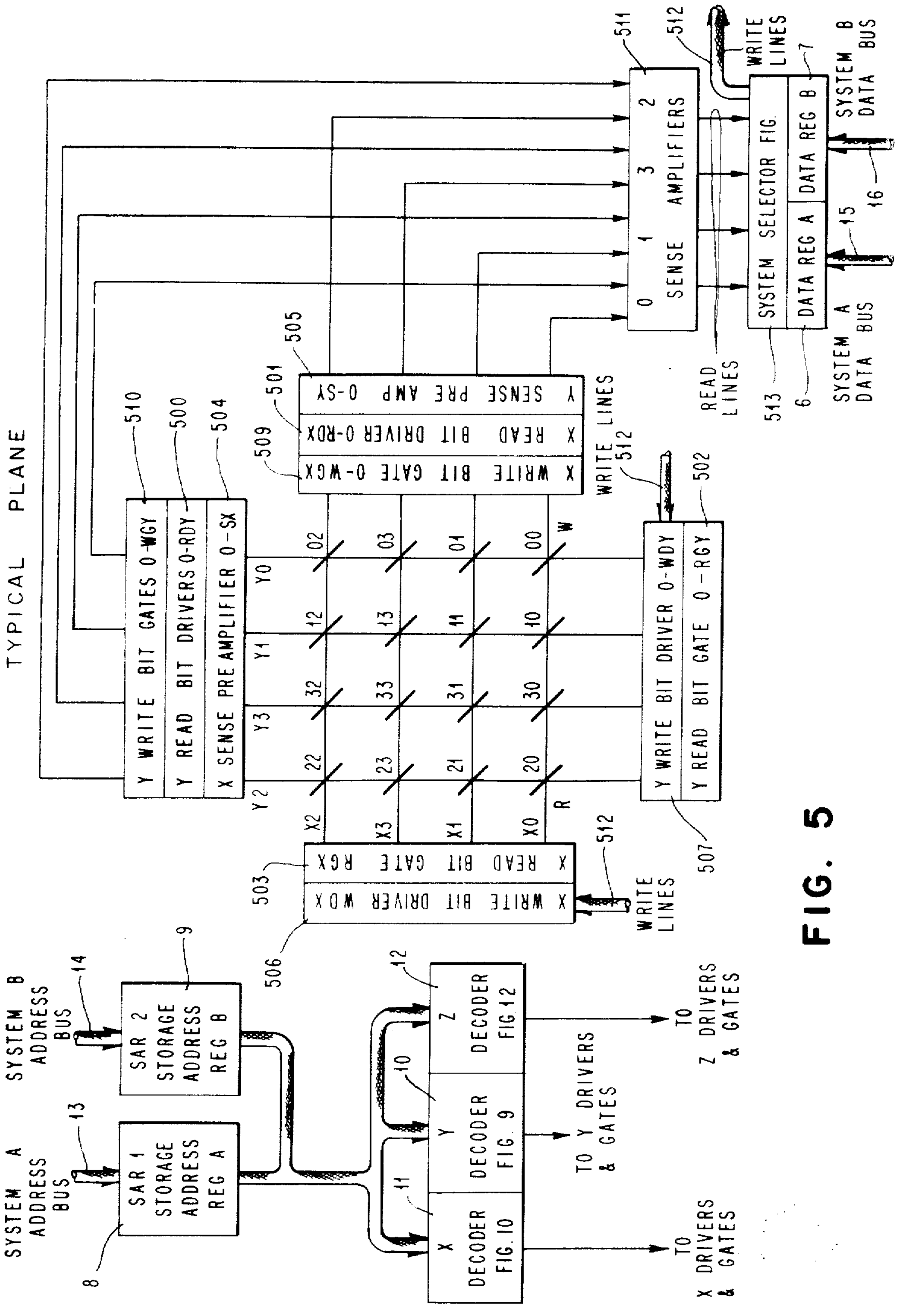
FIG. 5 is a block diagram showing a typical plane in the core storage embodiment.

Referring to FIG. 5, a typical plane, containing one bit of each of 16 words, of the three-dimensional array is schematically shown. Addresses are received on buses 13 and 14 and entered into storage address registers 8 and 9 which are connected to X-decoder 10, Y-decoder 11 and Z-decoder 12. The decoders 10, 11 and 12 supply signals to drivers and gates causing the array to exchange information with buses 15 and 16 via the data registers 6 and 7. The illustrative plane is defined by four rows X0, X1, X3 and X2 and four columns Y2, Y3, Y1 and Y0. Each array coordinate represents one bit of a word threaded by 16 Z-lines, not shown. During a read operation, the accessed locations are driven by their Z-drivers and either the Y read bit driver 500 or the X read bit driver 501 for those locations. One of the read gates 502 and 503, corresponding to the selected bit driver, is also operated and one of the sense preamplifiers 504 or 505 corresponding to the unselected driver is operated. During writing operations the Z-driver is again selected as is one of the X write bit driver 506 and the Y write bit driver 507. One of the write bit gates 509 and 510, corresponding to the selected write bit driver, is also operated. For example, assuming a read operation for word located in address 20 and a write operation for the word at location 00, the following selections are made:

During the read operation:

1. Read driver RDZ20 (not shown)
2. Read driver RDZ00 (not shown)
3. Read gate RGZ20 (not shown)
4. Read gate RGZ00 (not shown)
5. Read bit driver 501 (0–RDX0)
6. Read bit gate 503 (0–RGX0)
7. X sense preamplifier 504 (0–SX2) connected to line Y2.

For the write operation:

1. Write driver WDZ20 (not shown)
2. Write driver WDZ00 (not shown)
3. Write gate WDZ20 (not shown)
4. Write gate WGZ00 (not shown)
5. Y write bit driver 507 (0–WDY0 and 0–WDY2)
6. Y write bit gate 510 (0–WGY0 and 0–WGY2).

During reading operations the outputs of the selected ones of eight sense preamplifiers 504 or 505 are supplied to corresponding ones of four sense amplifiers 511. Each one of the sense amplifiers 511 corresponds to one of the four rows or columns to which sense preamplifiers 504 and 505 are connected. There are three cases. In case (a), where if simultaneously read words are in the same X-row, the X sense preamplifiers 504 will be connected to sense amplifiers 511 to simultaneously read the two words into a corresponding two of the four sense amplifiers. In case (b), where the simultaneously read words are in the same Y-column, the Y sense preamplifiers 505 are connected to the sense amplifiers 511 to permit simultaneous entry of the two words into the corresponding ones of the four sense amplifiers 511. In case (c), the simultaneously read words are "diagonally" located in the array and the Y sense preamplifiers 505 are connected to the sense amplifiers 511 as in case (a). During writing operations, the write bus 512 is connected to the write bit drivers 506 and 507 connecting them to the data registers 6 and 7. Since it is necessary to relate the addresses received in the address registers 8 and 9 to data in the data registers 6 and 7, a system selector 513 connects the sense amplifiers 511 to the corresponding one of the data registers 6 and 7, as will be explained in more detail with reference to FIG. 14.

Figures 6A, 6B:
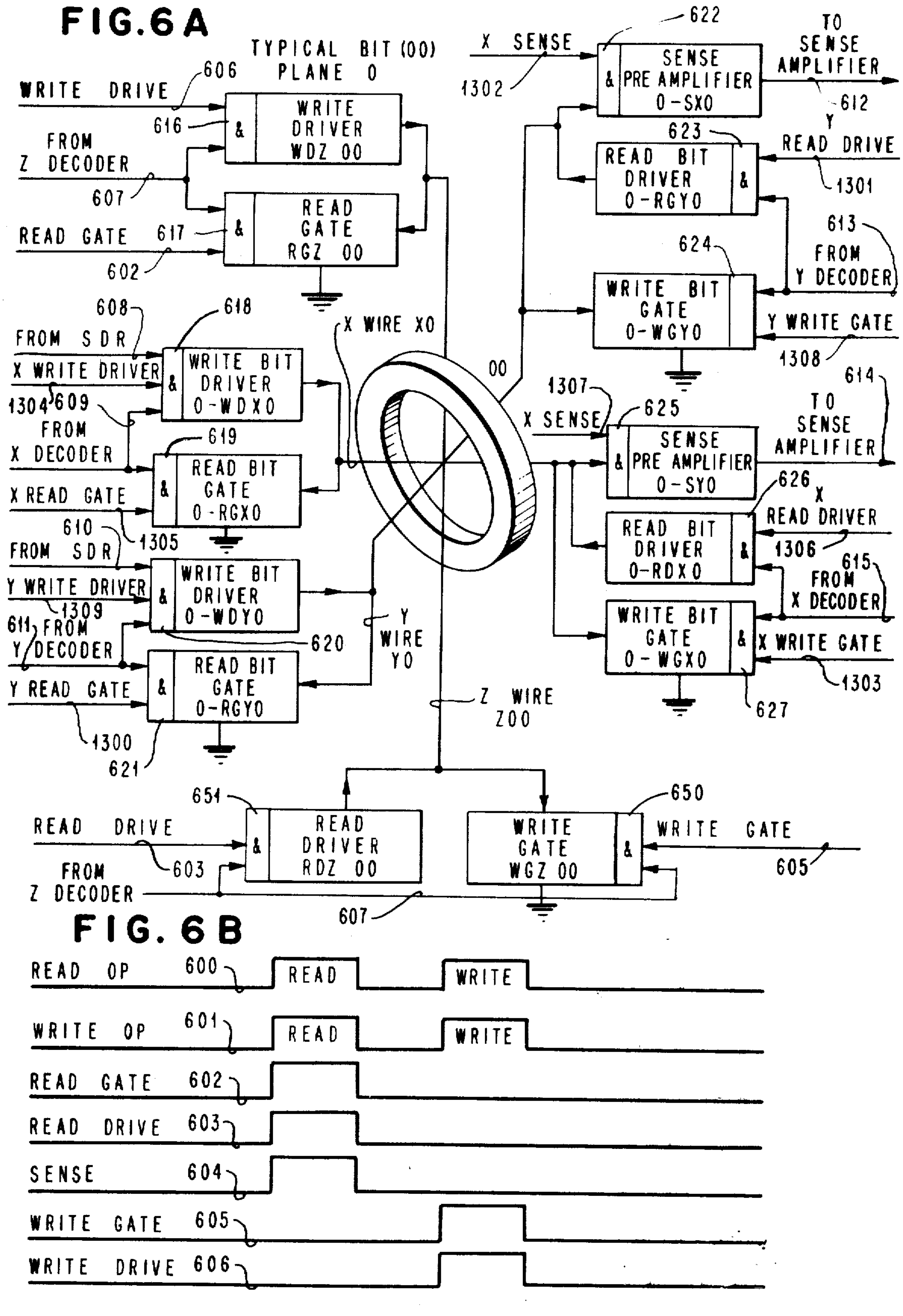
FIG. 6A is a block diagram illustrating a single bit in the core storage embodiment.
FIG. 6B is a waveform diagram illustrating signals available to the logic of FIGS. 6A and FIG. 13.

Referring now to FIGS. 6A and 6B, a typical bit, for example, at location 00 in plane 0, is shown to explain the detailed construction and operation of the accessing system in three dimensions. Inasmuch as little explanation of the very well known magnetic core storage is required, only those aspects bearing on the invention will be described. As shown in FIG. 6B, each storage-accessing cycle, whether it is a read operation 600 or a write operation 601, comprises a read portion and subsequent write portion. During the read half of the storage cycle read gate 602 and read driver 603 signals are available and during the write half of a storage cycle write gate 605 and write driver 606 signals are available. During the read portion of read operations a sense 604 signal is also available. A circuit for using these signals to supply the control inputs to the circuit of FIG. 6A will be explained in connection with FIG. 13. In a read operation, the contents of a location are sensed during the read portion of the cycle (they are destroyed in the process) and restored from the data register during the write portion of the cycle. During a write operation, the addressed location is destroyed during the read portion of the cycle and written into during the write portion of the cycle. During each cycle, the core is twice half selected by each of two activated drive wires forcing it to assume a known magnetic state. During read operations if it initially was not in this state, the change of state induces a current in the third wire indicative of this fact and the absence of such a current indicates that its state was not changed. Drive wires are activated by connecting their ends to different polarities, illustrated by a (current) driver at one end and a gate (to ground) at the other.

Beginning with a read operation, involving the bits at locations 00 and 20, the following signals are available in FIG. 6B: read op 600, read gate 602, read drive 603 and sense 604. Since the words are in the same row, one X-driver (X0) and two Z-drivers (Z00 and X20) will be selected as will the X sense preamplifiers on two Y-wires (Y0 and Y2). As will be explained with reference to FIG. 13, these signals result in signals on the following inputs: read gate 602, read drive 603, X read driver 1306, X read gate 1305, and X-sense 1302. The X-decoder 11 applies a signal on lines 609 and 615 and the Z-decoder 12 applies a signal on line 607. Signals on lines 1306 and 615 cause an output from AND-circuit 626 to operate read bit driver 0–RDX0 which sends a current through the X-wire X0 to ground via read bit gate 0–RGX0 which is activated by an output from AND-circuit 619 as the result of signals on lines 1305 and 609. The resulting current through the X0 wire half selects the core 00. A signal from the Z-decoder on line 607, together with the read gate signal 602, selects AND-circuit 617 to permit a current to flow through the Z-wire Z00 from read driver RDZ00 (which is selected by AND gate whose input is read driver signal on line 603 and Z decoder line 607) to ground through the read gate RGZ00. This current and the X0 current select the core 00 causing it to reverse it magnetization (if it originally contained a 1) which reversal of magnetization induces a current to flow in the Y0 wire which is sensed by sense preamplifier 0–SX0 as a result of X sense line 1302 signal. If there is no reversal in current (the core originally stored a zero) this is also sensed by the sense preamplifier 0–SX0. In both cases, the core is thus left in its zero state.

During the write portion of the read operation, the read op 600, the write gate 605 and write drive 606 signals are available. The information to be written appears from the storage data register on lines 608 and 610. During a reading operation, this information is identical to the contents of the accessed locations while, during writing operations, it will be specified externally. As will be explained with reference to FIG. 13, signals appear on the following lines entering the circuit of FIG. 6A: write drive 606, write gate 605, Y write driver 1309 and Y write gate 1308. The Y-decoder applies signals on lines 611 and 613 and the Z-decoder applies a signal on line 607. The coincidence of inputs on lines 610, 1309 and 611 to AND-circuit 620 causes a current to leave the write bit driver 0–WDY0 and travel via the Y-wire Y0 to ground via the write bit gate 0–WGY0 due to activation of the AND-circuit 624 by a coincidence of signals on lines 1308 and 613. This current half selects the bit 00. A coincidence of signals on lines 606 and 607 causes the AND-circuit 616 to operate the write driver WDZ00 to cause a current to flow through the Z-wire Z00 to ground via the write gate WGZ00 as a result of activation of the AND-circuit 650 by a coincidence of a write gate signal on line 605 and signal from Z-decoder 607. The two currents fully select the core 00. If there was a 1-bit on the line 610 from the storage data register, the core is set to the one state. If a zero bit is to be stored in the core 00, there will be no signal on line 610 and no current on the Y-wire Y0 so that the core will not be set to the one state and will continue to store a zero.

Figure 7:
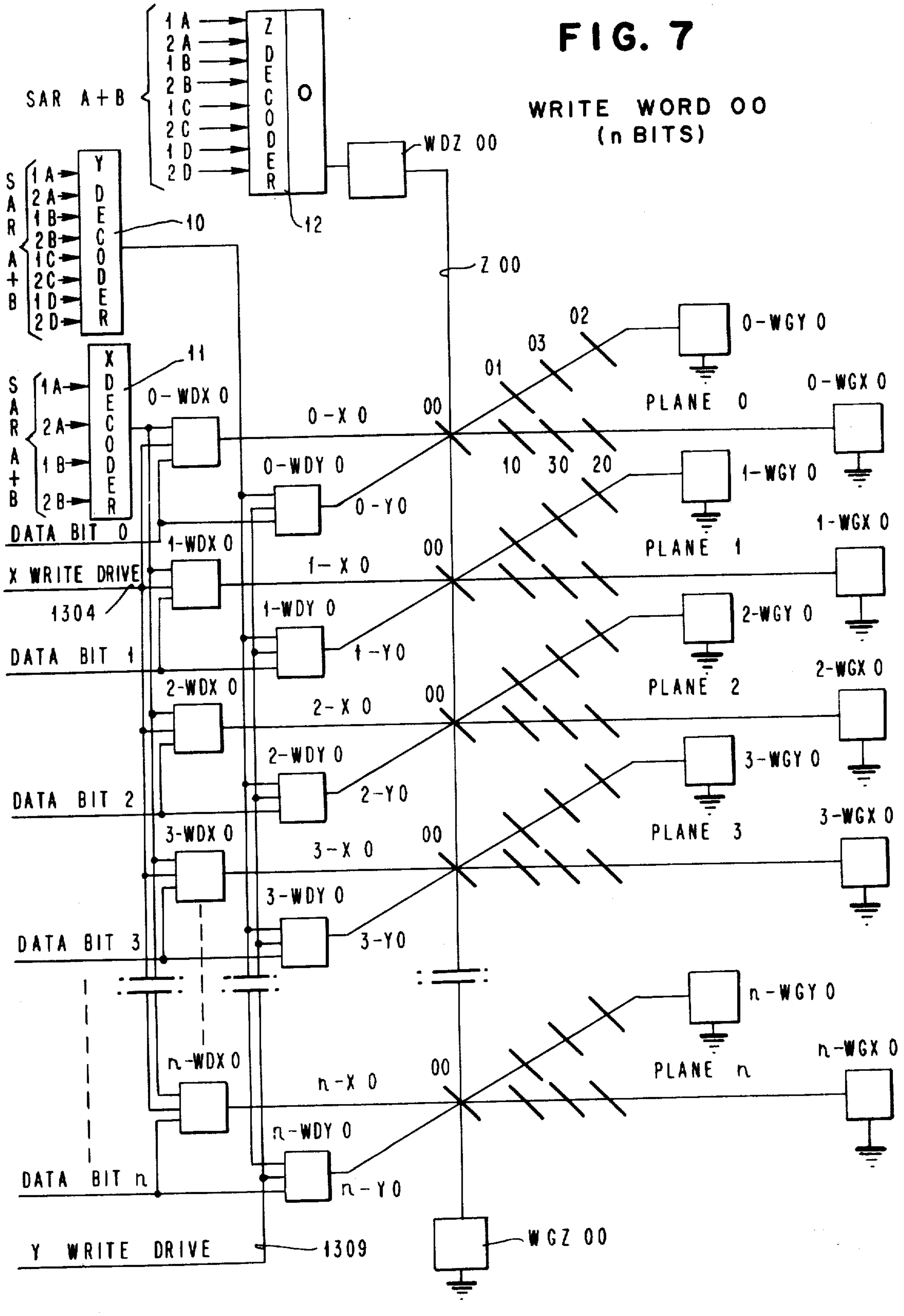
FIG. 7 is a block diagram illustrating a word in the core storage embodiment.

Writing of an entire word (illustratively, word 00), during the write portion of either a read or write portion will be illustrated with reference to FIG. 7. Bit 00 shown in detail in FIG. 6A, appears at the top of FIG. 7. It will be understood that for case of exposition, the details of FIG. 6A are not shown in FIG. 7. In FIG. 7, the X-decoder 11, Y-decoder 10 and Z-decoder 12 receive bits from the storage address registers 8 and 9, in accordance with a decoding scheme to be explained with reference to FIGS. 8A through 8D. The decoders 10 through 12 select Z-wire Z00 for driving and either the X-wires 0–X0 through *n*–X0 or the Y wires 0–Y0 through *n*–Y0 depending upon what other word is simultaneously being accessed. If the words fall in the same column of the array, or are neither in the same column nor row, then the X-wires will be driven and the data bits are entered on the data bit wires for bits 1 through *n*. The X write drivers 0–WDX0 through *n*–WDX0 will be operated by signals on the lines from the decoders 11 and 12 and the Y write driver line 1309 as previously described with reference to FIG. 6A, causing a current to flow through the X-wires 0–X0 through *n*–X0 to ground through the gates 0–WGX0 through *n*–WGX0 (which are selected as shown in FIG. 6A). The Z-decoder 12 causes the driver WDZ00 to pass a current through the Z00 wire to ground via the gate WGZ00 fully selecting all the bits of the word 00. Each core will be set to the one state if there is a 1-bit signal on the corresponding data bit line and will be left in the zero state (where it was put by a preceding read portion of the cycle) if there is no signal on the corresponding data bit line. In this way information is written into all cores of the word in the location 00. If, in the other hand, the two words to be simultaneously written were located in the same row of the array, then the Y-decoder 11 and a signal on line Y write drive 1309 would have selected the drivers 0–WDX0 through *n*–W-DY0 to pass a current through the Y-wires 0–Y0 through *n*–Y0 into ground through the gates 0–WGY0 through *n*–W-GY0. The cores in word location 00 are written into in exactly the same manner as before in accordance with the signals on the data bit lines for bits 0 through *n*, the full selection being accomplished by the Y- and Z-lines rather than the X- and Z-lines as previously described.

Detailed Description of Core Embodiment

The detailed circuitry of the X-decoder 10, Y-decoder 9, Z-decoder 12, system selector 513 and driver/gate selection will now be described.

Figure 8A:
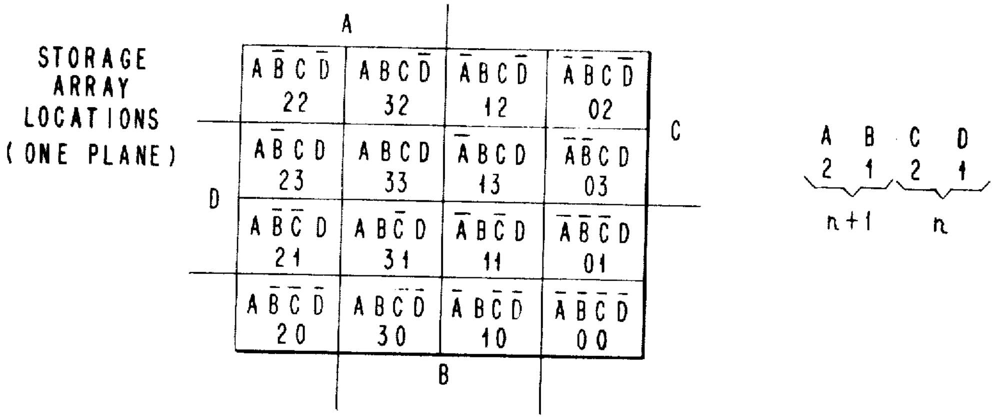
FIG. 8A is a diagram defining storage array locations in a core storage plane.

Referring first to FIGS. 8A through 8D, the conventions used to indicate storage locations will be described. In FIG. 8A, the array is designated in a standard manner whereby each location within the array is indicated by a combination of the applicable ones of the letters A through D. If pairs *n* and *n*+1 of the letters designating a location are assigned binary weights, then each location is uniquely identified by a two-digit binary coded quarternary number (BCQ) as shown. Each row is defined by like-valued digits *n* and each column by like-valued digits *n*+1, as illustrated by the X- and Y-lines of FIG. 5. While BCQ designations are illustratively shown here, any code may be used.

Figures 8B, 8C, 8D:
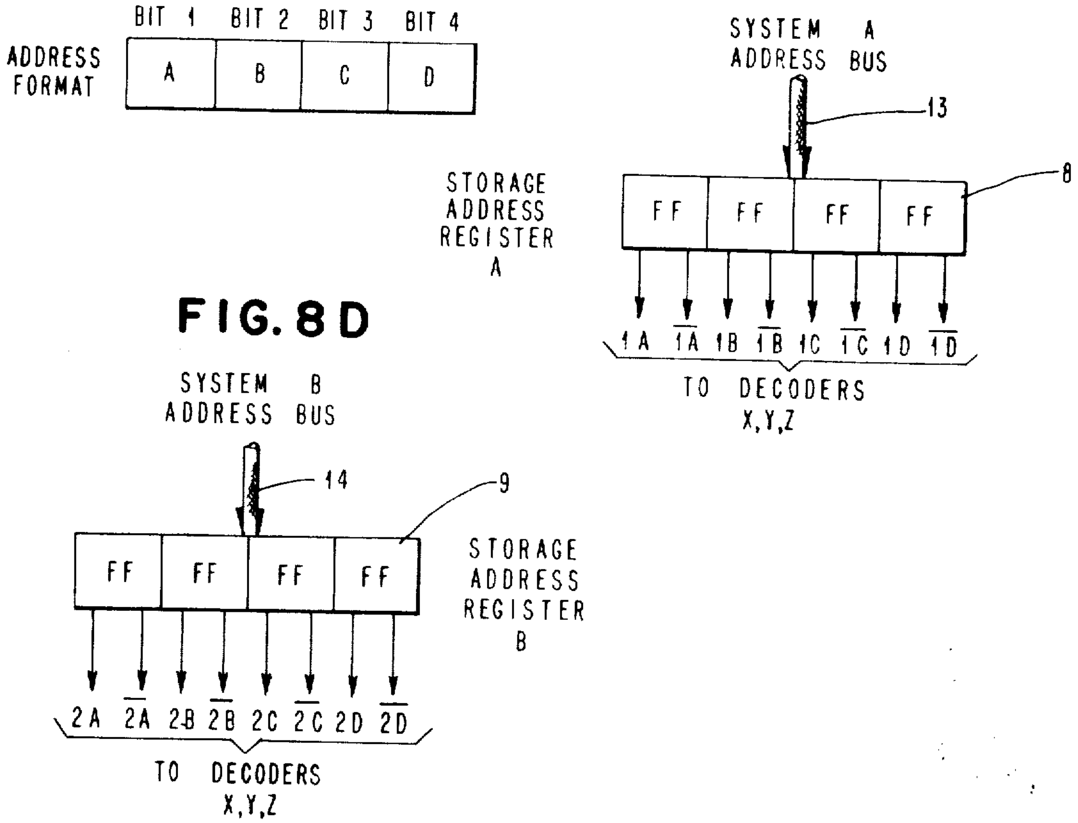
FIG. 8B is a diagram showing the address format of an address used to access a location in the core storage embodiment.
FIGS. 8C and 8D illustrate the storage address registers A and B.

In FIG. 8B, addresses in storage address registers 8 and 9 may be represented by a four-bit code corresponding to the values A, B, C and D in BCQ. As shown in FIG. 8C, the system A address is supplied to the storage address register 8 and, as shown in FIG. 8D, the system B address is supplied to the storage address register 9, each comprising a number of flip-flops indicating by their outputs the stored BCQ information. This information is supplied to the decoders 10, 11 and 12.

Figure 9:
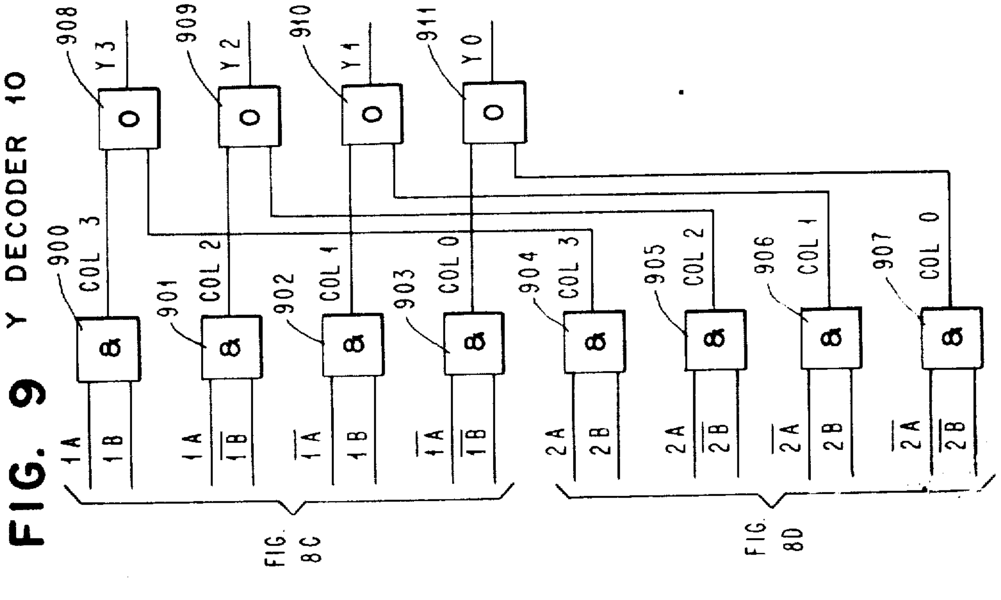
FIG. 9 is a logic diagram of the Y-decoder.

Referring now to FIG. 9, a logic diagram of the Y-decoder 10 is shown in detail. AND-circuits 900 through 903 are connected to storage address register 8 and AND-circuits 904 through 907 are connected to storage address register 9. The AND-circuits 900 through 903 recognize which column the address specified in storage address register 8 appears in and similarly AND-circuits 904 through 907 recognize the column specified by the address in storage address register 9, both in accordance with the convention defined in FIG. 8. OR-circuits 908 through 911 are each associated with corresponding columns of the array and indicate by an output if either of the addresses specified by storage address registers 8 and 9 are in the corresponding column. For example, a signal on line Y3 from OR-circuit 908 indicates that either storage address register 8 or storage address register 9 contain an address falling in column y3.

Figure 10:
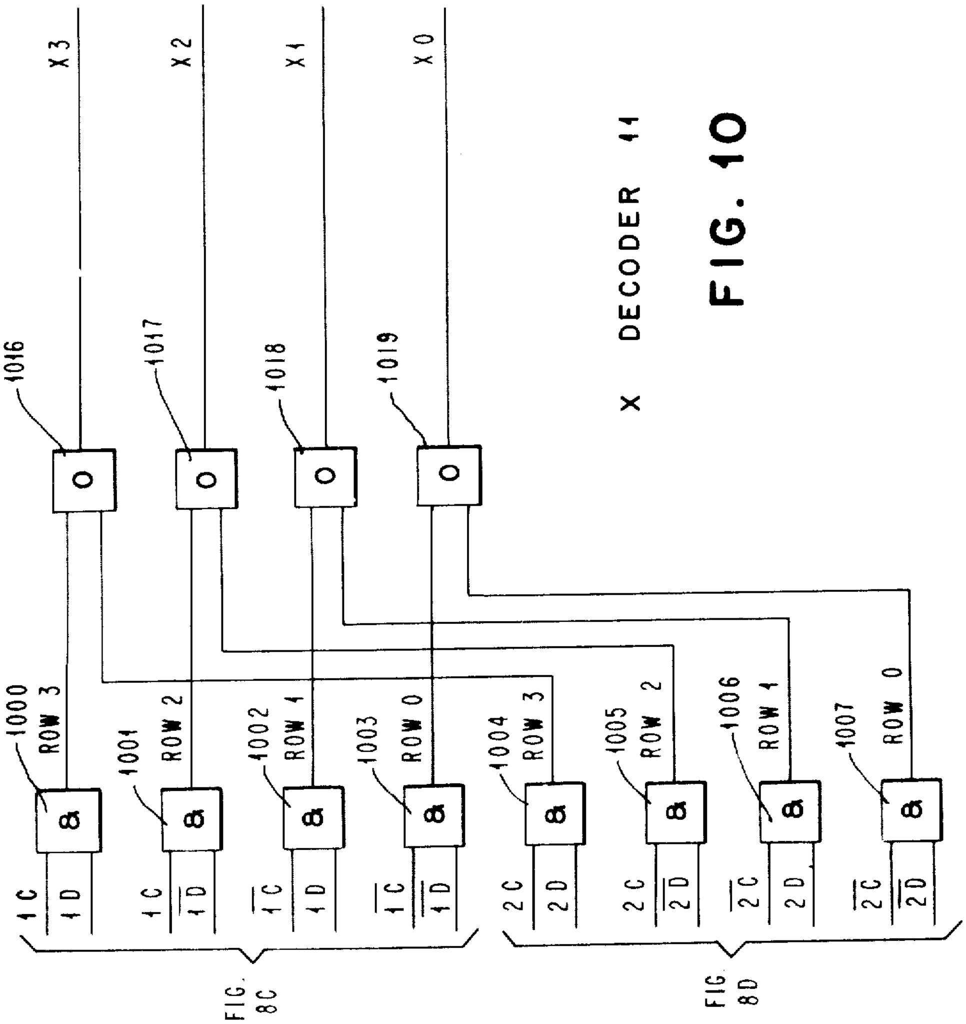
FIG. 10 is a logic diagram of the X-decoder.

Referring now to FIG. 10, the X-decoder 11 will be described. The X-decoder monitors the C- and D-positions of the address format in the storage address registers 8 and 9 for the purpose of determining which rows the addresses are located in and indicating which row that is. AND-circuits 1000 through 1003 monitor the C- and D-postions of storage address register 8 and indicate at their outputs which row is addressed. Similarly, AND-circuits 1004 through 1007 monitor the C- and D-outputs of storage address register 9 and indicate at their outputs which row is addressed by that storage address register. OR-circuits 1016 through 1019 are connected to corresponding ones of AND-circuits 1000 through 1003 and 1004 through 1007 for identifying addressed rows in the same as columns in FIG. 9.

The outputs of the X- and Y-decoders 11 and 10 are used differently in the three previously described cases: (a) the accessed words are in the same row, (b) the accessed words are in the same column and (c) the accessed words are neither in the same row nor the same column. Recognition of which of the cases exists is accomplished by the circuit of FIG. 11. EXCLUSIVE OR-circuits 1125 and 1126 each indicate by an output signal if either the corresponding A-positions and B-positions in the storage address registers 8 and 9 differ. Similarly, EXCLUSIVE OR'S 1127 and 1128 indicate if either the C- or D-positions differ. Therefore there will be an output from OR-circuit 1133 whenever the A- and B-positions in storage address register 8 do not have the same value as the corresponding positions in storage address register 9, and OR-circuit 1134 will similarly indicate inequalities between the C- and D-positions in the two registers. Referring to FIG. 8A, it is seen that the AB positions of two addresses indicating two words in the same row are different while the CD positions of the addresses are identical. Thus, for case (a) above, there is an output (a) from AND-circuit 1136 connected to OR-circuit 1133 and inverter 1137. If case (b) applies, there is an output (b) on line 1129 from AND-circuit 1139 which is connected to OR-circuit 1134 and inverter 1138 indicating that the C- and D-positions of the storage address registers 8 and 9 differ while the A- and B-positions are the same. Since case (c) is treated in the same manner as case (a), the outputs of AND-circuit 1135 and 1136 are supplied to line 1130 by OR-circuit 1124. As will be explained with reference to FIG. 13, the inputs to FIG. 5A are a function of which case is indicated.

Figures 11, 12:
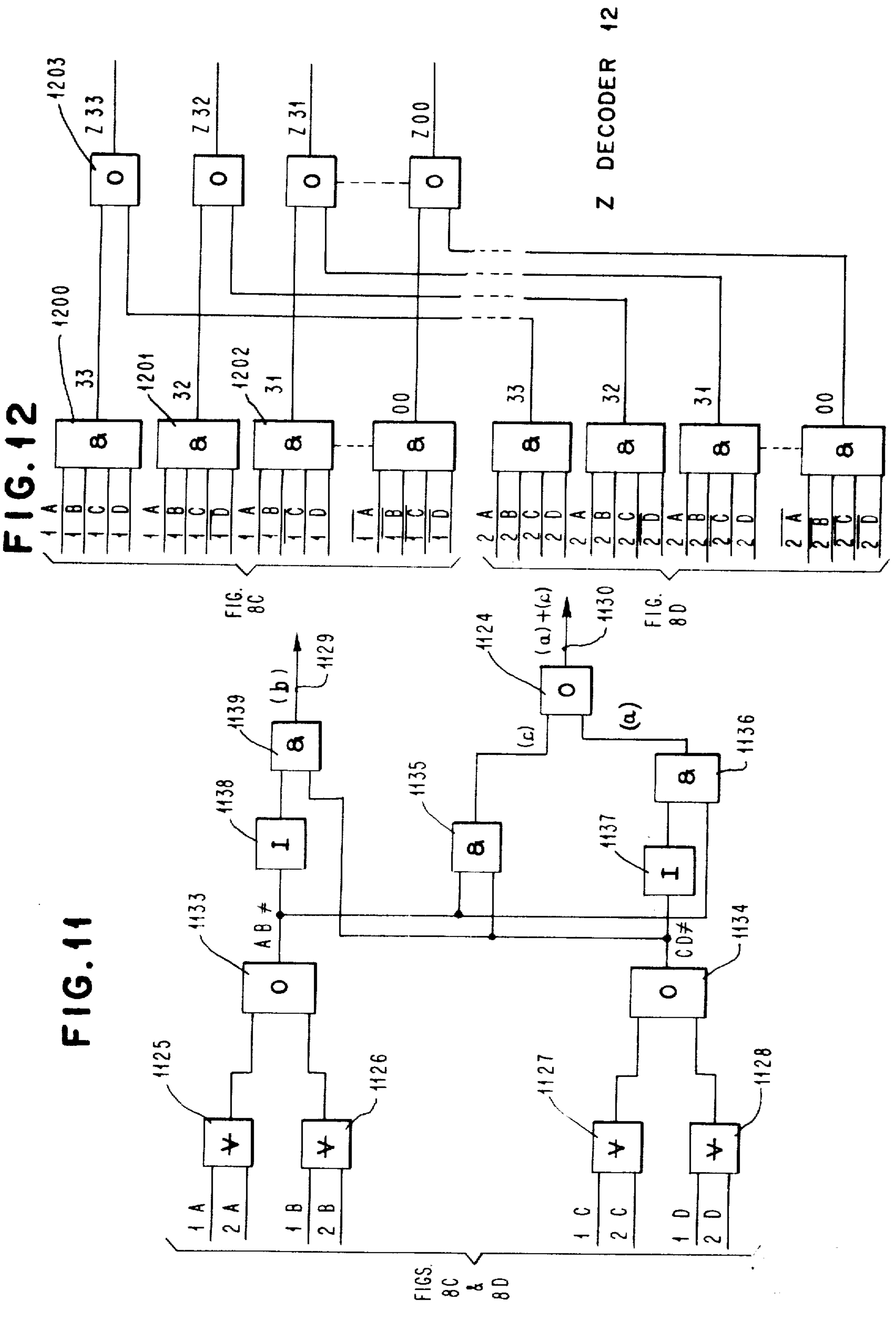
FIG. 11 is a logic diagram of a circuit for recognizing gate-accessing relationship.
FIG. 12 is a logic diagram showing the Z-decoder.

Referring now to FIG. 12, the Z-decoder 12 will be described. The Z-decoder monitors the A-, B-, C- and D-bits of both storage address registers 8 and 9 to decode their contents and indicating on 16 Z-wires the particular word location specified. AND-circuits 1200, 1201 and 1202 are illustrative of 32 AND circuits which decode the contents of the storage address registers 8 and 9 to indicate the particular word location specified by each storage address register. For example, AND-circuit 1200 decodes storage address register 8 true bit conditions and indicates at its output that the word location 33 is addressing if all storage address register 8 bit positions are 1. OR-circuit 1203 is illustrative of 16 OR circuits for monitoring corresponding Z-line indications from the groups of AND circuits associated with storage address registers 8 and 9. For example, if either storage address register 8 or storage address register 9 accesses a word at location 33, OR-circuit 1203 will indicate that wire Z33 is to be driven. Inasmuch as two locations in the memory may be simultaneously accessed, two Z-wires will usually be simultaneously driven, one of them specified by storage address register 8 and the other by storage address register 9.

Figure 13:
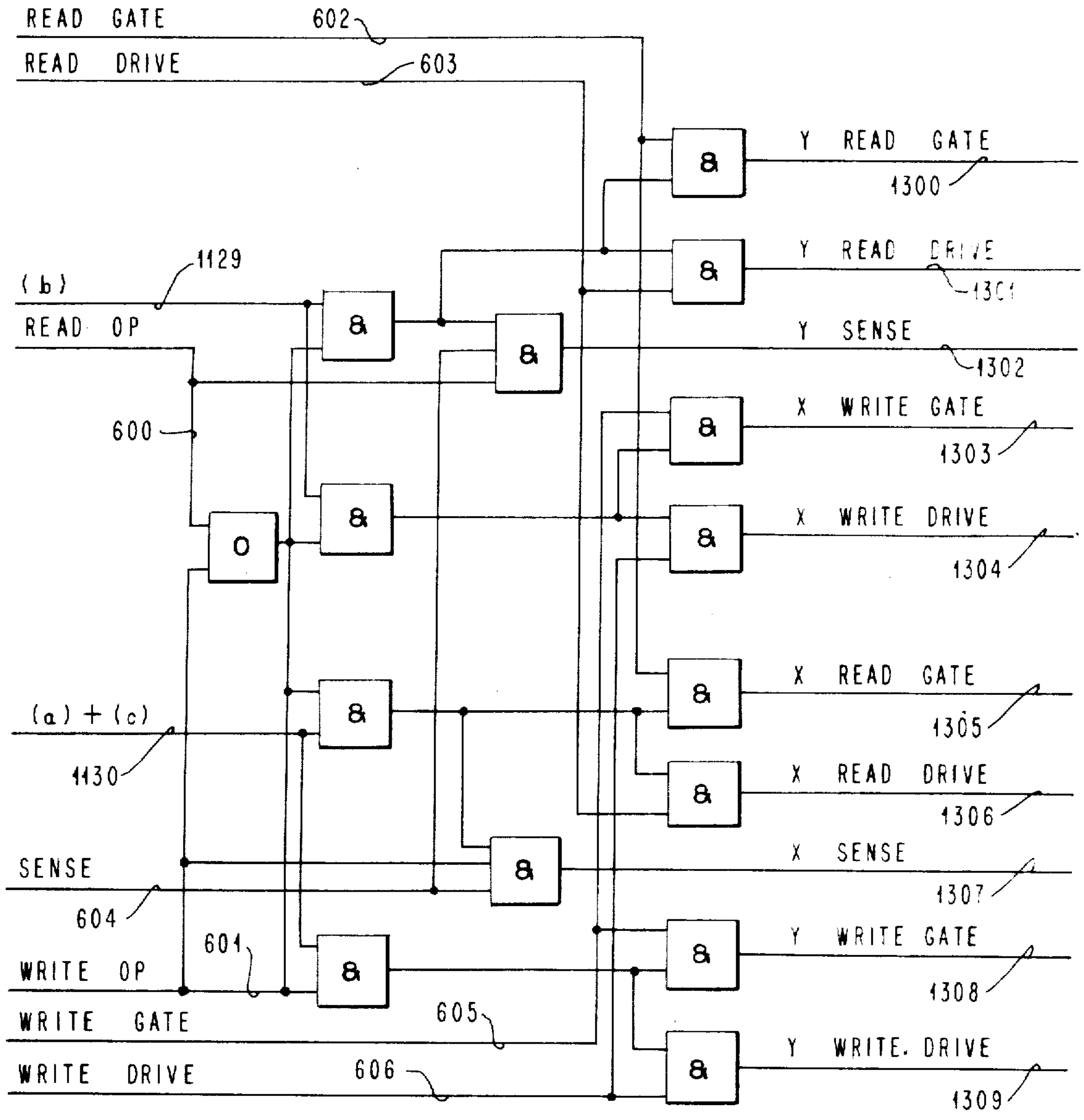
FIG. 13 is a logic diagram showing the driver, gate and sense selection circuit.

FIG. 13 illustrates the generation of gate, drive and sense signals for the circuit of FIG. 6A in response to the signals of FIG. 6B and FIG. 11. In cases (a) and (c) during reading, an X-line is driven and X-preamplifiers are used while, during writing, Y-lines are driven. In case (b), the Y-lines are driven and the Y-preamplifiers used during reading and the X-lines are driven during writing. The existence of cases (a) or (c) is indicated by a signal on line 1130 and of case (b) on line 1129. Signals 602 through 606 occurring at lines indicated in FIG. 6B appear on like-numbered lines. These signals are shown in idealized form, it being understood that signals of the type normally used in well-known core arrays are intended. The following table illustrates the output signals occurring on lines 1100 through 1309 in response to the above inputs.

TABLE

| Cycle Portion | Inputs | 1130 Case (a) or (c) 600 read op | 1130 Case (a) or (c) 601 write op | 1129 Case (b) 600 read op | 1129 Case (b) 601 write op |
|---|---|---|---|---|---|
| Read | 602 read gate | 1305 | 1305 | 1300 | 1300 |
| | 603 read drive | 1306 | 1306 | 1301 | 1301 |
| | 604 sense | 1307 | | 1302 | |
| Write | 605 write gate | 1308 | 1308 | 1303 | 1303 |
| | 606 write drive | 1309 | 1309 | 1304 | 1304 |

Figure 14:
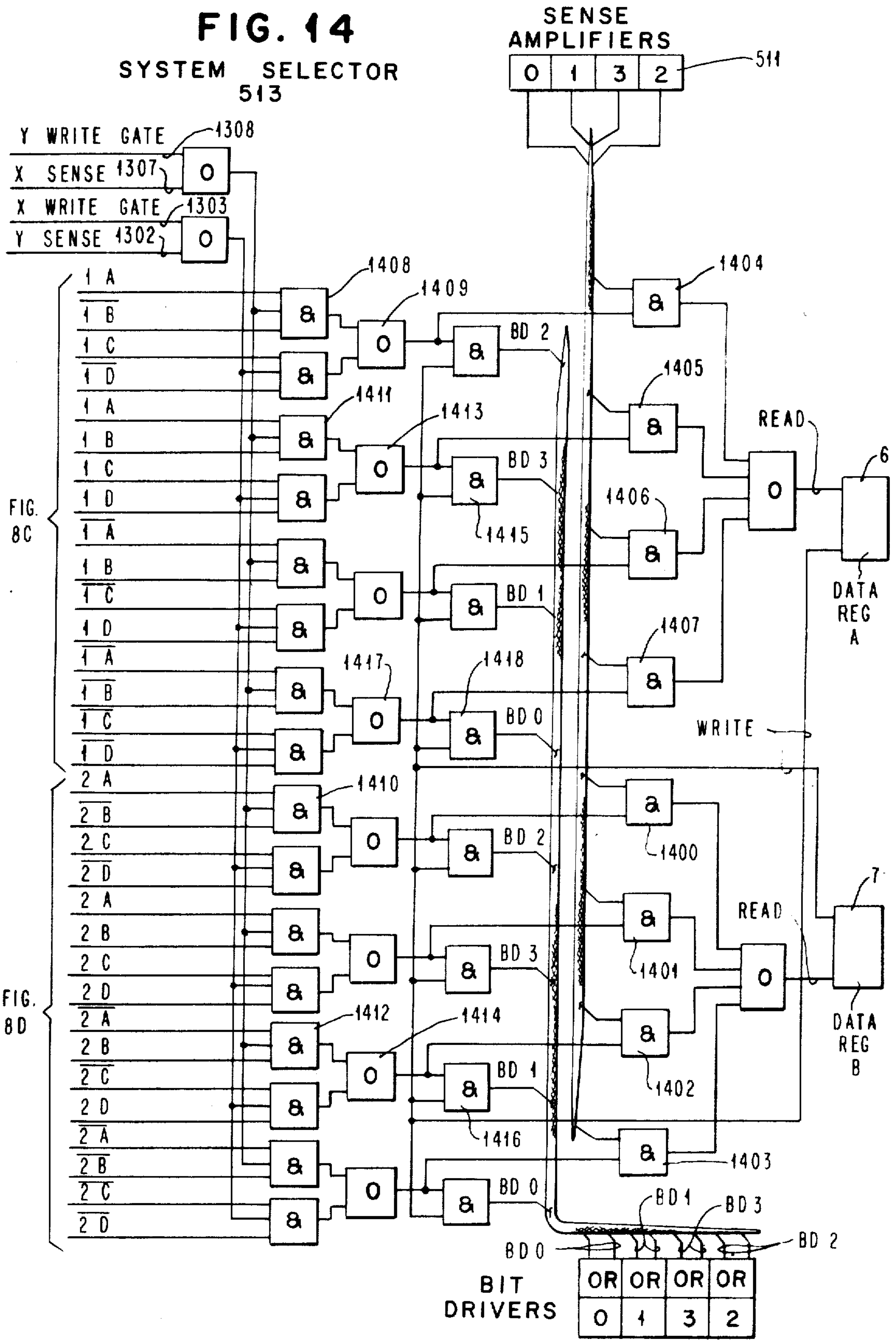
FIG. 14 is a logic diagram showing the system selector.

Referring to FIG. 14, the system selector 513 will now be explained. The purpose of the system selector is to relate the occupied two of the four sense amplifiers 511 with the proper ones of the storage address registers 8 and 9. Data register 6 will then contain the information corresponding to the address given to the storage array by storage address register 8 and data register 7 will similarly be related to storage address register 9. To fully understand the operation of the system selector 513 it is necessary to recall that the four sense amplifiers 511 are associated with particular rows or columns depending upon the word locations addressed. If the word locations addressed are in the same row, case (a), then the sense amplifiers are associated with correspondingly numbered columns. If the word locations are in the same column, case (b), then the sense amplifiers are associated with correspondingly numbered rows. Similarly, if the word locations are "diagonally" located, case (c), that is not in the same row or column, the sense amplifiers are associated with correspondingly numbered columns. Thus, it is known, that if storage address register 8 designated either a particular row or a particular column, the information will be found in the like-numbered sense amplifier 511. For example, if the storage address register 8 specified a word at location column Y3 row Y2, the information stored at that location will be found in either sense amplifier 2 or sense amplifier 3 of the sense amplifier 511. The choice of whether it will be in section 2 or 3 is determined by the contents of the other storage address register 9. If it contains an address indicating that the word associated with the storage address register 9 is located at column Y1 row X2, (that is, in the same row) the sense preamplifiers attached to the Y-columns Y1 and Y3 will be activated and the information contained in locations 32 and 12 will be sent through the sense amplifier 511 sections 3 and 2 corresponding to columns y3 and Y1.

As shown in FIG. 14, the sense amplifier 511 information may be passed into either data register 6 or data register 7 depending upon whether an AND circuit in group 1404 through 1407 or in group 1400 through 1403 is selected. For example, amplifier 2 of sense amplifiers 511 is gated to data register 6 if AND-circuit 1404 is selected and is gated to data register 7 if AND-circuit 1400 is selected. One AND circuit must be selected out of each of the groups 1400 through 1403 and 1404 through 1407 if the sense amplifiers 511 are to pass two words. This selection is accomplished by a series of AND circuits, of which 1408 and 1410 are representative, coupled to a series of OR circuits, of which 1410 is representative. Each one of the AND circuits (1408, 1410, etc.) is connected to a pair of storage address register signal lines and each OR circuit (1409, etc.) is connected to a pair of these AND circuits. The AND circuits of the group to which AND-circuit 1408 belongs is connected to storage address register 8 and the group of AND circuits to which AND-circuit 1410 belongs is connected to storage address register 9. The output of each one of the AND circuits indicates which row or column location has been specified by the associated storage address register. The output of the OR circuits will indicate whether a row or a column having a particular value has been indicated by the storage address register. The selection is then made by associating the address of storage address register 8 with that section of the sense amplifiers 511 which has the value of either the row or the column indicated by storage address register 8. Similarly the address stored in storage address register 9 is associated with that section of the sense amplifier 511 having a value that is the same as either the row or column indicated by storage address register 9. For example, if storage address register 8 for system A specifies a word at location 32 and storage address register 9 for system B specifies a word at location 12, case (a) is recognized by the circuit of FIG. 11 and signals from FIG. 13 appear on lines 1307 during reading and 1308 during writing. There will be signals from AND-circuits 1411 and 1412 and OR-circuits 1413 and 1412. During reading, the signal from OR-circuit 1413 will activate AND-gate 1405 associating sense amplifier 3 with data register 6 for system A and during writing bit driver 1303 will be similarly associated with data register 6 via AND-circuit 1415. A signal from OR-circuit 1414 will activate AND-circuit 1402 associating sense amplifier 1 with data register 7 for system A during reading, and bit driver 1301 is associated with data register 7 via AND-circuit 1416 during writing.

Example of System Operation

The operation of the invention will now be described with reference to the FIGURES. Referring first to FIG. 8A, the example assumes the reading of location 02 by system A and 13 by system B. In FIG. 8B, the address format for system A is 0010 ($\bar{A}\bar{B}C\bar{D}$) and 0111 ($\bar{A}BCD$) for system B. In FIG. 8C, the contents of the storage address register 8 are $\bar{A}\bar{B}C\bar{D}$. In FIG. 8D, the contents of the storage address register 9 are $\bar{A}BCD$.

Referring to FIG. 1, the contents $\bar{A}\bar{B}C\bar{D}$ of storage address register 8 will address location 02 in the storage array 1 and place the contents in data register 6. The contents $\bar{A}BCD$ of storage address register 9 will address the storage array 1 location 13 and place the contents in data register 7. Utilizing the embodiment of FIGS. 2A and 2B for this example, storage address register 8 for system A is assigned to the central processing unit and storage address register 9 for system B is assigned to the input/output subsystem. The assignments are made, as shown in FIG. 2B, by activating lines 31, 34 and 35 to set the flip-flop FFS to the one state and the flip-flop FFM to the zero state. As a result, the flip-flop FFA is set to the zero state placing a signal on the CPU A control line and the flip-flop FFB is set to the 1 state placing a signal on the input/output I/O B line. This assigns the storage address register 8 to CPU address bus 19 and data register 6 to the CPU data bus 20. The storage address register 9 is assigned to the input/output address bus 21 and data register 7 is assigned to the input/output data bus 22. Referring now to FIG. 5, the contents of the storage address register 8 and storage address register 9 are made available to the X-decoder 10, the Y-decoder 11 and the Z-decoder 12. Referring to the Y-decoder 10 in FIG. 9, the signals $1\bar{A}$ and $1\bar{B}$ from the storage address register 8 enter AND-circuit 903, causing a Y0 output from OR-circuit 911, and the signals $2\bar{A}$ and 2B from storage address register 9 enter AND-circuit 906, causing a Y1 output from OR-circuit 910. There are two outputs Y0 and Y1 from the Y-decoder 10. Referring to FIG. 10, X-decoder 11 inputs 1C and 1D to circuit 1001 cause a signal on the row X2 line from OR-circuit 1017 and inputs on lines 2C and 2D to AND-circuit 1004 cause an output from the row X3 from OR-circuit 1016.

In FIG. 11, case (c) is identified by a signal on line 1130 as a result of inputs to both legs of AND-circuit 1135, inputs to AND-circuits 1139 and 1136 being blocked by inverters 1138 and 1137 respectively. Only EXCLUSIVE OR-circuits 1126 and 1124 have output signals because only their inputs ($1\bar{B}$, 2B and $1\bar{D}$, 2D) differ.

In FIG. 12, the Z-decoder 12 includes two AND circuits (not shown) one corresponding to inputs $1\bar{A}$, $1\bar{B}$, 1C and $1\bar{D}$ and the other corresponding to inputs $2\bar{A}$, 2B, 2C and 2D. The outputs of these AND circuits, designated 02 and 13, operate OR circuits (not shown) for driving lines Z02 and Z13.

In FIGS. 6B and 13, and the table, the occurrence of signals on lines 1130 and 600, 602, 603 and 604 results in outputs on lines 1305, 1306 and 1307 which activate AND-circuits 619, 626 and 625 in FIG. 6A (AND-circuit 617 being activated by a signal on line 602). Thus the X-decoder lines X2 and X3 and Z decoder lines Z02 and Z13 drive select current through all cores in the words at locations 02 and 13 while sense preamplifiers attached to lines Y0 and Y1 are selected. The operation of each bit of each word is illustrated by the single bit shown in FIG. 6A. The Z-lines for words 02 and 13 will be driven by a current traveling from read driver RDZ02 into ground through read gate RGZ02 and from read driver RDZ13 into ground through read gate RGZ13. Another half current will flow through all the cores in the selected words from the read bit drivers 0-RDX2 to *n*-RDX2 through the core to ground via read bit gates 0-RGZX2 to *n*-RGX2. For the other word, the current flow will be from read bit driver 0-RDX3 to *n*-RDX3 to ground through read bit gates 0-RGX3 to *n*-RGX3. The Y-wires Y1 and Y0 connect words 02 and 13 to sense preamplifiers SX0 and 1.

Referring again to FIG. 5, simultaneous activation of lines X2 and X3 and X02 and Z13 causes the contents of all the cores in words 02 and 13 to be passed through SX0 and SX1 sense preamplifiers 504 to amplifiers 0 and 1 of sense amplifiers 511. These amplifiers are connected to data registers 6 and 7 by the system selector 513. Referring to FIG. 14, the system selector 513 examines the contents of storage address register 8 and, as a result, OR-circuit 1417 is operated to cause ANDocircuit 1407 to connect amplifier 0 of the sense amplifiers 511 to the data register 6. Examination of the contents of the storage address register 9 causes signals to emerge from OR-circuit 1314 operating AND-circuit 1402 which connects amplifier 1 of sense amplifiers 511 to the data register 7.

Referring again to FIG. 2A, the data register 6 now contains the contents of the storage array 1 location 02 specified by storage address register 8 and data register 7 contains the information at the location 13 specified by storage address register 9. The contents of the data register 6 are placed on the bus 15 and gated via the gate 28 to the CPU data bus 20 while the contents of the data register 7 are placed on the bus 16 and gated by the gate 29 onto the input/output data bus 22.

Referring again to FIGS. 6A, 6B and 13 and the table, the occurrence of signals 600, 605 and 606 during the write portion of the read operation cause signals to appear on lines 1308 and 1309 to AND-circuits 624 and 620, AND-circuit 616 being selected by the signal on line 606. As a result the Y-lines and Z-lines are driven to restore the cores to their initial states. In FIG. 6A, currents on Z-wires Z02 and Z13 flow from write drivers WDZ02 and WDZ13 to ground through write gates WGZ03 and WGZ13 respectively. Those Y-wires of 0–Y0 to *n*–Y0 and 0–Y1 to *n*–Y1 which correspond to 1 bits in the storage data registers 6 and 7, also pass currents through their cores from associated write bit drivers 0–WDY0 to *n*–WDY0 into ground via write bit gates 0–WGY1 to *n*–WGY1 and 0–WDY1 to *n*–WDY1 via 0–WGY3 to *n*–WGY3. Referring to FIG. 14, bit drivers BD0 and BD1 are associated with data registers 6 and 7 respectively via AND-circuits 1418 and 1416, and in FIG. 2A, the storage array 1 locations 02 and 13 now contain the information entered into the data registers 6 and 7 during the previous portion of the read operation.

The invention is equally applicable to systems requiring accessing of three or more locations simultaneously in a single memory by providing an additional wire for each additional simultaneous access desired. The disclosure of the core embodiment is not intended to limit the storage array to magnetic core embodiment, it being foreseen that the storage array may be constructed of solid-state devices capable of storing single bits at each storage array location.

While the invention has been shown and described herein with reference to preferred embodiments thereof, it will be understood by those skilled in the art that the foregoing and other changes in form and details may be made therein without departing from the spirit and scope of the invention.

What is claimed is:

1. In an information-handling system including a multicoordinate memory having a number of selectable locations, each location being defined by a plurality of coordinates and capable of storing one data-representative word, means for simultaneously selecting a plurality of locations, comprising:

a pattern of redundant addressing lines for each location in excess of that needed to address and read the data out of the location so that the locations may be addressed independently of one another without conflict;

a number of storage address sources, each simultaneously operable to supply signals on lines identifying any one location of the number of selectable locations including simultaneously selecting identical selectable locations;

a number of storage driver groups exceeding the number of storage address sources, each driver group having a plurality of inputs and outputs, each driver group being assigned to one coordinate of the memory so that each of the addressing lines for any location is driven by an output of one of the driver groups and including for each such coordinate value one driver group operable in accordance with signals at its input to partially select via its output all locations defined by the coordinate value; and a number of decoders, equal to the number of coordinates, each connecting the storage address source lines to the driver inputs for simultaneously operating more than one of said driver outputs, in accordance with signals on the storage address source lines, to select the plurality of locations identified by the storage address sources.

2. The system of claim 1, wherein each location is definable by X-, Y- and Z-coordinate values to each of which is assigned a driver.

3. The system of claim 2, wherein the decoders including means for operating a number of driver outputs, to select each location identified by a source.

4. The system of claim 3, wherein the operating means includes means for operating one driver associated with a Z-coordinate value and one driver associated with a selected one of the X- and Y-coordinate values to select each location identified by the storage source.

5. The system of claim 4, wherein sensing and driving means are associated with both the X- and Y-coordinate values and are operated to communicate with each selected location.

6. An information-handling system wherein a plurality of units share a multilocation storage having each location simultaneously accessible by signals on addressing lines and being capable of storing only one information bit, means for providing a simultaneous storage access for all said units, comprising:

a pattern of redundant addressing lines for each location in excess of that needed to address and read the data out of the location so that the locations may be simultaneously addressed independent of one another without conflict;

a storage address source and a corresponding data source for each unit, supplying on an address bus for each unit signals identifying a storage location and on a data bus for each unit signals identifying data to be communicated with said location;

storage address registers and data registers each operable to hold, respectively, signals identifying a storage location and signals identifying data to be communicated with said location; and gating means, interconnecting the registers and the buses, selectively operable to permit each storage address register to receive an address from a selected one of the address buses and each data register to communicate data with a selected one of the data buses.

* * * * *